Aug. 19, 1952     L. A. SARVER     2,607,343
SYRINGE PIPETTE
Filed May 2, 1951

INVENTOR.
LANDON A. SARVER
BY
ATTORNEY.

Patented Aug. 19, 1952

2,607,343

UNITED STATES PATENT OFFICE 2,607,343

SYRINGE PIPETTE

Landon A. Sarver, Roanoke, Va., assignor to American Viscose Corporation, Wilmington, Del., a corporation of Delaware Application May 2, 1951, Serial No. 224,213

13 Claims. (Cl. 128—218)

This invention relates to an improved syringe pipet and is particularly concerned with a modification thereof adapted to facilitate the accurate measurement of repeated doses or samples, especially of the same volume.

It is an object of the invention to provide a simple attachment which can be applied to many standard forms of hypodermic syringes to modify them to serve the purposes of the present invention. It is also an object of the invention to provide a form of syringe pipet of simple construction which will facilitate the accurate measurement of repeated doses or samples. It is also an object of the invention to provide an improved plunger adapted to cooperate with the calibrated cylinder of many standard forms of syringes for serving the purposes of the invention. Other objects and advantages of the invention will be apparent from the drawing and the description thereof hereinafter.

Figure 1:
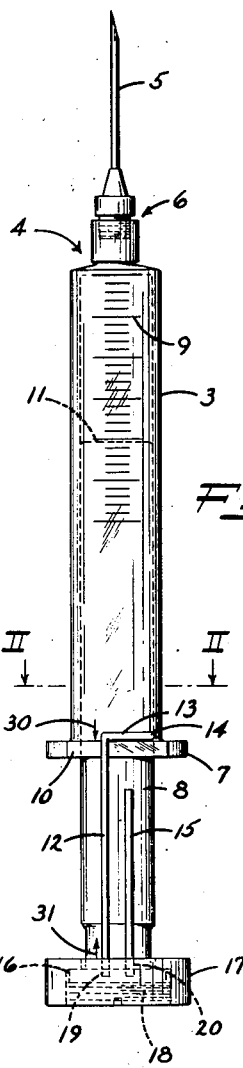
Figure 1 is a side view of a preferred embodiment of the invention in which the modification of the invention takes the form of an attachment applicable to standard syringes.
Figure 3:
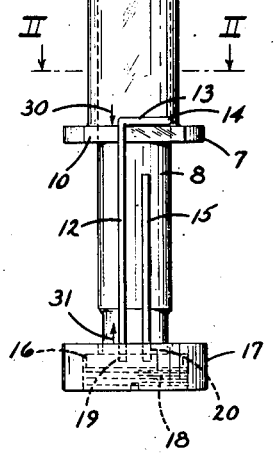
Figure 3 is a similar section but showing a different positional relationship of the parts.
Figure 3:
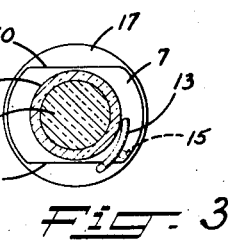
Figure 2:
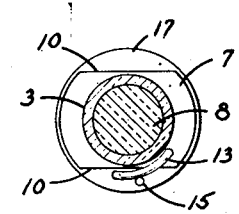
Figure 2 is a section taken on line II—II of Figure 1.

As shown in the embodiment of Figures 1 to 3, the syringe pipet comprises a main body having a calibrated hollow cylinder 3. One end of the cylinder is necked down abruptly at 4 and is connected to a conduit 5, which may be any suitable needle such as a No. 18 guage stainless steel needle, which is attached to the cylinder by the coupling 6.

The cylinder is provided with a member 7 which projects outwardly from its body at any point along itself. Preferably, as shown, this member 7 takes the form of a flange at the end of the cylinder 3 into which the plunger 8 enters. As shown, the member 7 may be integral with the cylinder 3 which may be made either of a transparent or opaque material, such as glass, plastics, or stainless steel. If of an opaque material, the calibrations 9 may be omitted since they serve no purpose in such a case. The member 7 has a portion along one side 10 which is of reduced external radius or is completely omitted to make it possible for parts of the attachment to pass freely beyond the member 7 when such parts are rotated into proper position with respect thereto.

The plunger 8 has an outside cylindrical diameter which is complementary to and fits slidingly within the internal cylindrical wall of the cylinder 3. While the plunger may be solid, it may also be formed of a hollow cylindrical tube terminating in a closed end 11. Guard means comprising a rod 12 is secured to the plunger at a point thereon beyond any portion thereof adapted to extend into the cylinder 3. The rod 12 has a laterally projecting portion 13 which may extend arcuately and concentrically, or approximately so, about a portion of the cylinder 3. This guard means serves to abut against the member 7 to prevent thereby the plunger 8 from being accidentally withdrawn entirely from the cylinder 3. Preferably, the member 7 extends outwardly from the cylinder 3 on both sides of the ambit of motion of rod 12 so as to limit the rotation of the plunger relative to the cylinder 3 whereby the terminal end 14 of the projecting portion 13 of the guard rod cannot be moved out of the way of flange 7 unintentionally. However, the rod 12 may be made of a springy, resilient material to enable one to spring the end 14 outwardly in order to take the pipet apart for cleaning.

Control means comprising a rod 15 is also secured to the plunger. This rod 15 may simply extend parallel to the major portion of rod 12 and is positioned radially outwardly from the plunger a distance which enables it to be moved past the portion 10 of member 7 but not so far out from the center of the plunger that when the plunger is rotated into the relative position shown in Figure 3 the rod 15 can escape the projection 7.

The guard means 12 and control means 15 may be secured to the plunger 8 by any suitable means. As shown, the plunger is provided with an integral outwardly extending flange 16 to which the ring 17 may be secured by means of a plug 18 which is threaded into a recess formed in the ring 17. The rods 12 and 15 may then simply be press-fitted into suitable bores 19 and 20 in the ring 17. While the ring 17 is shown secured to the plunger in the preferred end position thereof, that is, on the outer end of the plunger, it may be secured to the plunger away from the end thereof provided it is on a portion of the plunger which is outside of the cylinder 3 when the plunger is inserted to the maximum extent therein.

When the member 7 is a symmetrical flange with two flattened sides as clearly shown in Figure 2, it may be desirable to assemble the plunger and cylinder in the same relative positions every time the instrument is used to obtain the most precise measurements repeatedly. This may be accomplished by providing suitable indicia, such as the arrows 30 and 31, on the external wall of cylinder 3 and the external wall of the plunger 8.

While Figure 1 shows an attachment comprising elements 17, 18, 12 and 15 which is adapted to be secured to a flange 16 on any standard plunger of a conventional hypodermic syringe, it is within the scope of the invention to form a somewhat larger flange integrally with the plunger 8 into which the rods 12 and 15 may be secured in any suitable fashion, such as by press-fitting or screw threading, as shown in the next embodiment.

Figure 4:
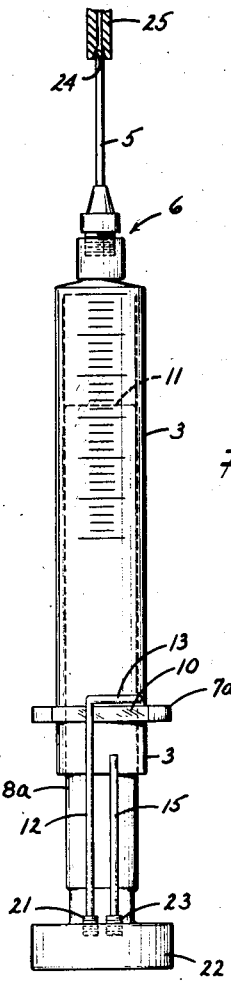
Figure 4 is a modification showing a system for deaeration of the contents of the pipet.

In Figure 4, a modification is shown in which the member 7a (corresponding to the member 7 in Figures 1 to 3) is either integral on the cylinder 3 or suitably secured thereon but in any event is fixed at a position away from the end of the cylinder 3. The guard means 12 may be a rod extending from a threaded stud 21 which is screwed into a suitable bore in a flange or flanged head 22 of the plunger 8a. Similarly, rod 15 extends from a stud 23 which threadedly engages a suitable bore in the flanged head 22. By the use of the threaded stud attachments for rods 12 and 15, the system is readily adapted to the substitution of rods of different length to provide any desired predetermined sample volume.

In operation, the needle of the syringe pipet is introduced into the liquid to be sampled or to be measured while the plunger is inserted all the way within the cylinder 3. Liquid is then sucked into the cylinder 3 by withdrawal of the plunger 8 or 8a until the end 14 of rod 12 engages the member 7 or 7a. The plunger of the pipet occupies the relative position with respect to the member 7 shown in Figure 2 up to this stage. The next operation, if no bubbles have been introduced during the withdrawal of the plunger, is to rotate the plunger relative to the cylinder into the position of Figure 3 and to move the plunger forward until the control rod 15 abuts against the member 7 or 7a. This may be done before or after withdrawal of the discharge conduit 5 from the body of liquid being sampled. Thereafter, the liquid may be ejected into any desired container by merely rotating the plunger relative to the cylinder back into the position of Figure 2 and then forcing the plunger as far as it will go into the cylinder.

If the liquid contents sucked into the cylinder contain a number of bubbles such as may occur when sampling a viscous material, the pipet, immediately after the sample has been introduced by withdrawing the plunger until the end 14 of rod 12 strikes the member 7 or 7a, is withdrawn from the body of liquid being sampled and held in a vertical position with conduit 5 directed upward and tapped to cause the bubbles to rise upwardly. Then the plunger 8 or 8a is rotated relative to the cylinder 3, into the position of Figure 3, and moved vertically upward into the cylinder until the control rod 15 abuts against flange member 7 or 7a, in order to discharge any air bubbles along with the excess liquid. At the same time, the discharge conduit 5 is preferably inserted loosely into the tapered opening 24 of a tube 25 of suitable bore to which suction is applied while the bubbles and excess liquid are being discharged. The excess liquid may thus be drawn off into a suitable container without spilling over the outside of the pipet where it might cause inconvenience or injury to the operator. The use of the suction may or may not be accompanied by tapping of the cylinder. A loose fit between the end of the discharge conduit 5 and the tapered opening 24 of tube 25 is usually preferable to a tight one, since in the latter case the application of too strong a suction may actually introduce more bubbles into the pipet. After the bubbles and excess liquid have been removed as described above, the sample may be ejected into any suitable container, as in the previous case.

It is to be understood that changes and variations may be made without departing from the spirit and scope of the invention as defined in the appended claims.

I claim:

1. A syringe pipet comprising a hollow cylinder for containing a liquid to be measured, a conduit communicating with one end of the cylinder for introduction and discharge of liquid, a member projecting laterally from the cylinder, a plunger reciprocably and rotatably mounted in the cylinder for introducing and displacing liquid with respect to the cylinder, guard means secured to the plunger and extending along the cylinder for engaging the laterally extending member to prevent accidental complete withdrawal of the plunger from the cylinder, and control means secured to the plunger for engaging the member to predetermine the position of the plunger within the cylinder.

2. A pipet as defined in claim 1 in which the guard means and control means are secured to the head of the plunger at the end thereof outside of the cylinder.

3. A pipet as defined in claim 1 in which the guard means comprises a rod extending alongside the plunger which has a laterally extending portion extending alongside the cylinder and adapted to engage the laterally projecting member on the cylinder.

4. A pipet as defined in claim 1 in which the guard means comprises a rod extending alongside the plunger which has a laterally extending portion extending alongside the cylinder and adapted to engage the laterally projecting member on the cylinder and the control means comprises a rod shorter than and extending alongside, the first-mentioned rod.

5. A pipet as defined in claim 1 in which the laterally projecting member is a flange integral with the cylinder having adjacent portions extending radially outwardly from the cylinder different distances.

6. A pipet as defined in claim 1 in which the guard means comprises a rod extending alongside the plunger and having a laterally extending portion extending alongside the cylinder and adapted to engage the laterally projecting member on the cylinder and the control means comprises a rod shorter than, and extending alongside, the first-mentioned rod and in which the laterally projecting member is a flange integral with the cylinder having adjacent portions extending radially outwardly from the cylinder different distances.

7. A pipet as defined in claim 6 in which the flange on the cylinder is disposed at the extreme end thereof away from the conduit.

8. An attachment for a syringe pipet comprising a ring adapted to be secured to a flange on the portion of the plunger of said pipet which is outside the main cylinder thereof, a pair of rods extending generally axially from said ring, said rods being of different lengths, the longer of the rods having a laterally projecting portion.

9. An attachment as defined in claim 8 in which the laterally projecting portion of the longer rod extends generally arcuately about the axis of the ring substantially in a plane extending at right angles to the axis of said ring.

10. As an article of manufacture, a plunger for a syringe pipet, said plunger having a cylindrical outer wall adapted to fit slidingly within the inside wall of the cylinder of a pipet, a ring on a portion of the plunger which is to be outside the cylinder at all times, a pair of elements secured to the ring, disposed radially outwardly from the plunger, and extending alongside the plunger, one of said elements being longer than the other and having a laterally projecting portion spaced farther from the ring than the end of the other element.

11. An article of manufacture as defined in claim 10 in which said laterally projecting portion is disposed substantially in a plane at right angles to the axis of the plunger.

12. An article of manufacture as defined in claim 11 in which said elements consist of generally parallel rods extending approximately parallel to the axis of the plunger and in which said laterally projecting portion is of arcuate shape and approximately concentric with respect to the axis of the plunger.

13. A syringe pipet comprising a hollow cylinder for containing a liquid to be measured, a conduit communicating with one end of the cylinder for introduction and discharge of liquid, a member projecting laterally from the cylinder of such a shape that a control means attached to a plunger sliding within the cylinder can be made to engage or pass at will the said laterally projecting member, a plunger reciprocably and rotatably mounted in the cylinder for introducing and displacing liquid with respect to the cylinder, guard means secured to the plunger and extending along the cylinder for engaging the laterally extending member to prevent accidental complete withdrawal of the plunger from the cylinder, and control means secured to the plunger for engaging the aforesaid laterally extending member to predetermine the position of the plunger within the cylinder.

LANDON A. SARVER.

No references cited.